United States Patent [19]

Sukimoto et al.

[11] Patent Number: 4,504,010
[45] Date of Patent: Mar. 12, 1985

[54] TEMPERATURE CONTROL DEVICE

[75] Inventors: Yasuyuki Sukimoto, Yahata; Toshiaki Nagao, Muko, both of Japan

[73] Assignee: Omron Tateisi Electronics Co., Kyoto, Japan

[21] Appl. No.: 494,894

[22] Filed: May 16, 1983

[30] Foreign Application Priority Data

May 17, 1982 [JP] Japan ................................. 57-83674

[51] Int. Cl.³ ............................................... F23N 5/20
[52] U.S. Cl. ................................. 236/46 F; 236/78 R; 364/557; 374/102
[58] Field of Search ................. 236/78 D, 46 R, 94, 236/74 R, 78 R, 46 F; 374/102, 107; 364/557, 574, 575

[56] References Cited

U.S. PATENT DOCUMENTS

| | | | |
|---|---|---|---|
| 2,946,943 | 7/1960 | Nye et al. ...................... | 236/78 D |
| 3,763,362 | 10/1973 | Griem, Jr. ...................... | 364/574 X |
| 3,927,309 | 12/1975 | Fujiwara et al. ................ | 364/574 |
| 4,193,118 | 3/1980 | Nash et al. ..................... | 364/575 X |
| 4,298,947 | 11/1981 | Tamura et al. .................. | 364/575 X |
| 4,344,565 | 8/1982 | Kojima et al. .................. | 236/91 C X |
| 4,373,351 | 2/1983 | Stamp, Jr. et al. ............. | 236/46 R X |

*Primary Examiner*—Harry Tanner
*Attorney, Agent, or Firm*—Wegner & Bretschneider

[57] ABSTRACT

An improved temperature control device which is so arranged that, by obtaining an average value of digital output amount of an A/D converter, if variation of the above digital output amount average value at each sampling is within predetermined dead zone data, it is regard that there is no change, while on the other hand, if the above variation is larger than the dead zone data, control is effected on the assumption that variation has taken place by the amount obtained by removing the dead zone data from the amount of the variation.

5 Claims, 6 Drawing Figures

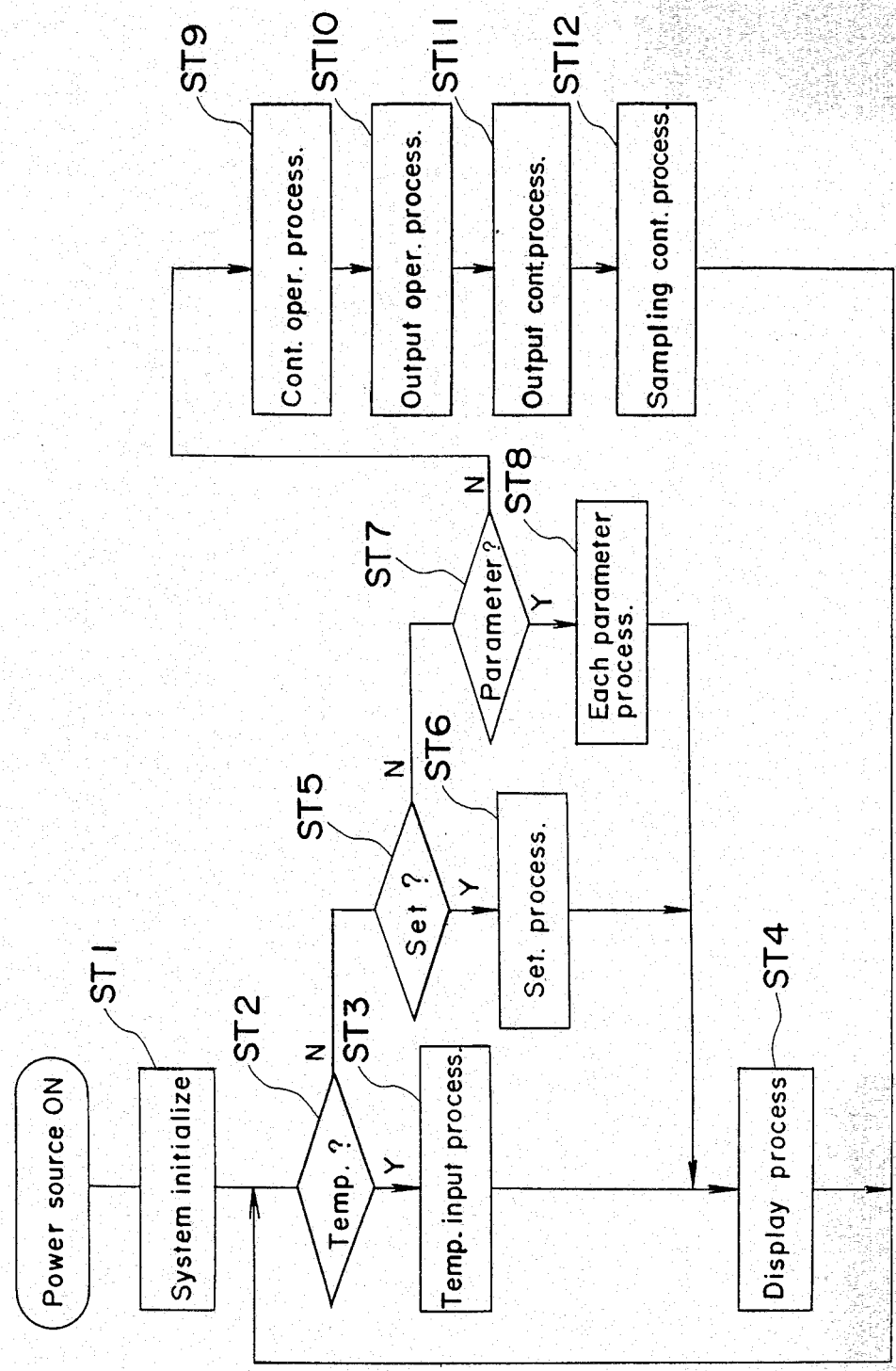

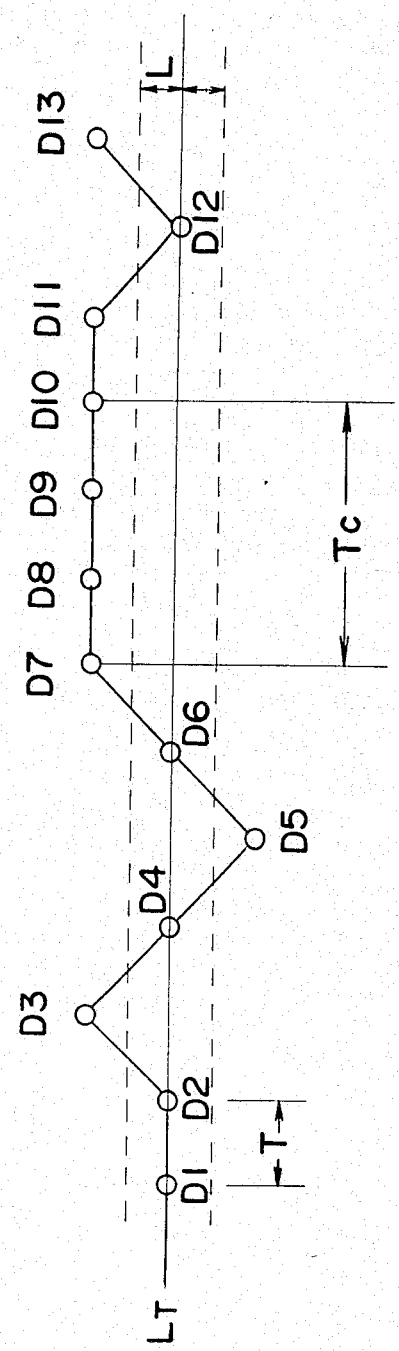

TEMPERATURE CONTROL DEVICE

BACKGROUND OF THE INVENTION

The present invention generally relates to a temperature controller and more particularly, to a temperature control device arranged to control temperature of an object to be controlled, for example, to be close to a predetermined or set target value.

Conventionally, there has been proposed a temperature control device for controlling temperature of an object to be controlled, which is so arranged that, analog output signal corresponding to temperature of the object to be controlled is converted into a digital amount by an A/D converter so as to be applied to a digital operation or calculation unit, and a predetermined calculation is effected by the above digital operation unit based on said digital amount and a set target value, so that output control amount is produced by the result of the above calculation for being applied to the object to be controlled, thereby to control the temperature of said object. Although a thermo-couple, temperature measuring resistor or the like is employed as a temperature detecting means for the temperature control device of the above described type, the output of the thermo-couple or resistance value variation of the temperature measuring resistor as referred to above is very small, and therefore, if such outputs are to be directly applied to the A/D converter for processing as they are, an A/D converter having an extremely high resolving power is required. Accordingly, it has been a common practice to amplify the output of the thermo-couple, temperature measuring resistor or the like by an amplifier to a proper value for processing by the A/D converter, with such amplifier being normally constituted by one operational amplifier so as not to increase cost for the temperature control device on the whole. Therefore, in the known arrangement as described above, it is inevitable that the output of the amplifier contains ripple component of about several mV due to noises induced into input or power source voltage. Meanwhile, since the resolving power of the A/D converter is normally in the order of approximately 1 mV/bit, the output data of the A/D converter are undesirably altered only by the ripple component. Consequently, if the output data of such A/D converter are to be used for the control calculation, control is effected as if the temperature value were altered by the ripple component contained in the output data, even when the temperature is not actually varied, thus making it impossible to effect proper control as intended. Therefore, in some prior art temperature control devices, the A/D converter is employed in a double integral system for removing the undesirable ripple component. However, since the double integral system referred to above requires a comparatively long data measuring time, in the case where, for example, P.I.D. constant and other parameters, etc. are set in the form of analog values besides the analog output value from the temperature detecting means so that these various values are taken into the operation or calculation unit through conversion thereof into digital amount by one A/D converter, much more time is required for the processing, with a consequent reduction of processing speed of the temperature control device as a whole.

SUMMARY OF THE INVENTION

Accordingly, an essential object of the present invention is to provide an improved temperature control device which is capable of obtaining a stable digital amount of measurement without influence by noises due to ripple component, etc., even when an A/D converter having a high conversion processing speed (for example, of a successive comparison type or high speed double integral type and the like) is employed, with substantial elimination of disadvantages inherent in the conventional temperature control devices of this kind.

Another important object of the present invention is to provide a temperature control device of the above described type, which is simple in construction and accurate in functioning at high reliability, and can be readily manufactured at low cost.

In accomplishing these and other objects, according to one preferred embodiment of the present invention, there is provided a temperature control device including means for detecting temperature of an object to be controlled, an A/D converting means for converting analog amount from said temperature detecting means into digital amount, a target value setting means, an operation unit for effecting predetermined calculation based on the digital amount from said A/D converting means and the target value from said target value setting means, and an output control section for applying a predetermined control amount of said object based on result of the calculation by said operation unit. The temperature control device of the present invention is characterized in that there are further provided means for obtaining an average value of the digital output amount from said A/D converting means, means for obtaining a difference value between the digital output amount average value thus obtained and a digital output amount average value previously detected and separately stored, means for comparing said difference value with predetermined dead zone data, and means for deciding a digital output amount similar to the previous digital output amount in the case where said difference value is smaller than said dead zone data in the comparison by said comparing means and for deciding a digital output amount on the assumption that digital amount has been varied by a value obtained through subtraction of said dead zone data from said difference value in the case where said difference value is larger than said dead zone data, thereby to effect the predetermined calculation at said operation unit by said digital output amount thus decided.

By the arrangement of the present invention as described above, an improved temperature control device stable in functioning at high reliability has been advantageously obtained through simple construction.

BRIEF DESCRIPTION OF THE DRAWINGS

These and other objects and features of the present invention will become apparent from the following description taken in conjunction with the preferred embodiment thereof with reference to the accompanying drawings, in which;

FIG. 2 is a flow-chart showing a normal processing flow for the temperature control device of FIG. 1, FIG. 6 is a diagram showing examples of temperature variations for supplementary explanation of the flow-chart of FIG. 4.

DETAILED DESCRIPTION OF THE INVENTION

Figure 1:
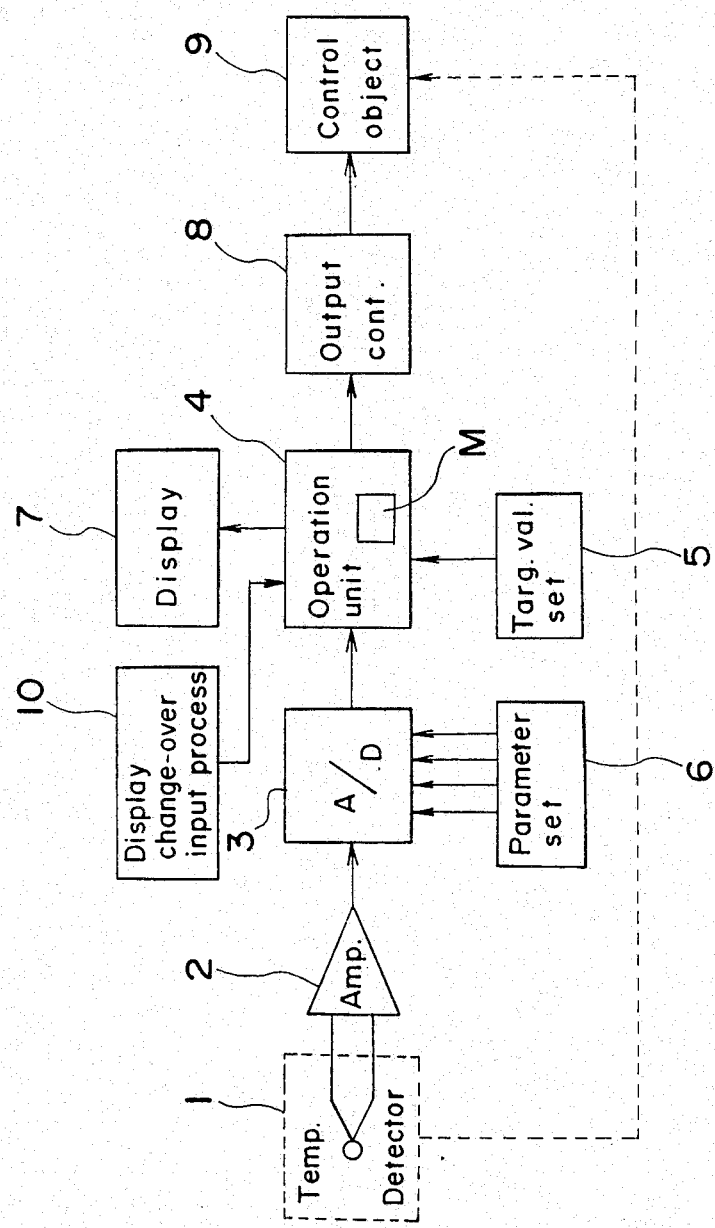
FIG. 1 is a block diagram showing a general construction of a temperature control device according to one preferred embodiment of the present invention.

Before the description of the present invention proceeds, it is to be noted that like parts are designated by like reference numerals throughout the accompanying drawings.

Referring now to the drawings, there is shown in FIG. 1 a block diagram of a temperature control device for effecting the present invention, which includes a temperature detector 1 coupled to an operation or calculation unit 4 (micro-processor) having a memory means M, through an amplifier 2 and an A/D converter 3, with the operation unit 4 being further coupled to an object 9 to be controlled through an output control section 8, a parameter setting unit 6 connected to the A/D converter 3, and a display change-over input processing section 10, a target value setting unit 5, and a display unit 7 further coupled with the operation unit 4. For the temperature detector 1 to detect the temperature of the object 9 to be controlled at all times, there may be employed, for example, a thermocouple or thermo-electric thermometer, thermistor thermometer, etc. The amplifier 2 is intended to amplify analog signal corresponding to the temperature as detected by the temperature detector 1 up to a specified level, and the analog signal amplified by the amplifier 2 is converted into digital amount by the A/D converter 3 so as to be taken into the operation unit 4. The target value is set by the target value setting unit 5 in the form of digital value, while parameters such as P.I.D. constant, etc. are similarly set by the parameter setting unit 6 in the analog form, these being taken into the operation unit 4 through the A/D converter 3. The operation unit 4 is arranged to effect predetermined calculations based on the detected temperature, target value, P.I.D. constant, etc. to produce output control amount through the output control section 8 for maintaining the object 9 in a controlled state. The output control section 8 is formed, for example, by a driver, relay, etc., while the object 9 is constituted, for example, by a heating unit or cooling unit or the like. Meanwhile, the display unit 7 for indicating respective data normally displays the detected temperature. The display change-over input processing section 10 is arranged to successively display, in a stepwise advancing manner, the target value or parameter value on the display unit 7 normally displaying the detected temperature, each time a switch (not particularly shown) provided in the processing section 10 is operated.

General functionings of the temperature control device of FIG. 1 having the construction as described so far will be explained hereinbelow based on the normal processing flow-chart in FIG. 2 and the timer interruption flow-chart in FIG. 3.

Figure 3:
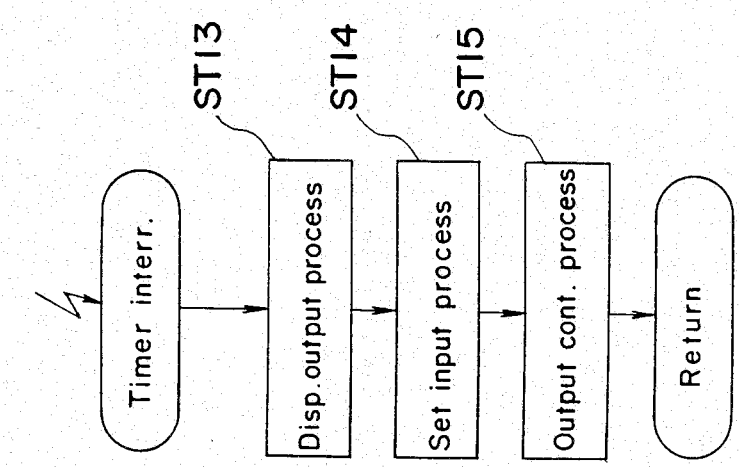
FIG. 3 is a flow-chart showing a timer interruption flow for the temperature control device of FIG. 1.

It should be noted here that the processings as shown in FIGS. 2 and 3 are effected through control by the operation unit 4 referred to earlier.

In the first place, upon turning on of a power source by a main switch (not shown), a so-called initializing processing such as clearing of each register in the operation unit 4 to zero, etc. is effected at a step ST1, and a temperature input processing, i.e. taking the temperature value as detected by the temperature detector 1 into the operation unit 4, is first effected at steps ST2 and ST3. Subsequently, processing is transferred to setting of the target value after carrying out display processing of the temperature value at a step ST4 for taking the target value set by the setting unit 5 into the operation unit 4 at steps ST5 and ST6. Moreover, the various parameters set by the setting unit 6 are also successively taken into the operation unit 4 at steps ST7 and ST8. After taking-in of the data from the step ST2 to step ST8 has been effected, control operation processing (step ST9), output operation processing (step ST10), output control processing (step ST11), and sampling control processing (step ST12) are carried out, with the cycle processings from the step ST2 to step ST12 being repeated per each sampling time.

Meanwhile, the temperature control device according to the present invention is also so arranged that the timer interruption as shown in FIG. 3 may be applied thereto at a much more shorter time cycle than in the sampling time as described above for effecting display output processing (step ST13), set input processing (step ST14), and output control processing (step ST15) respectively, depending on necessity.

Subsequently, details of a temperature input processing routine related to the present invention in the general ordinary processing flow as described so far, will be explained with reference to the processing flow-chart shown in FIG. 4.

Figure 5:
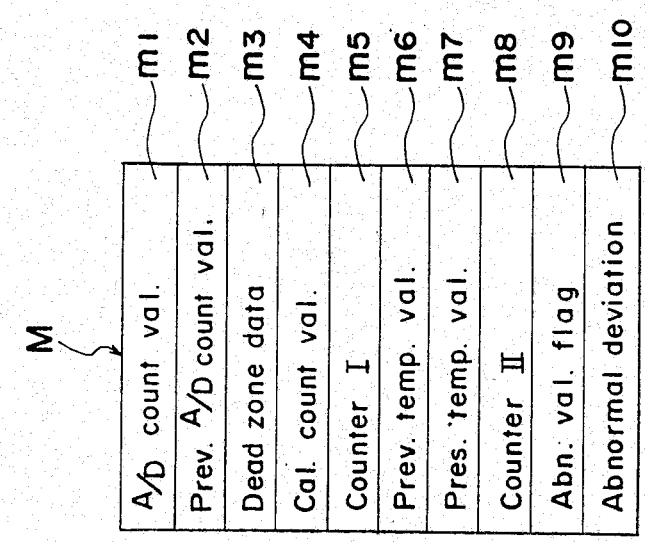
FIG. 5 is a diagram showing an arrangement for memory areas of a memory section incorporated in an operation or calculation unit employed in the temperature control device of FIG. 1.

It should be noted here that, various data referred to in the following description are stored in the memory section M incorporated in the operation unit 4 and having memory areas m1, m2, m3, m4, m5, m6, m7, m8, m9 and m10 as shown in FIG. 5.

Figure 4:
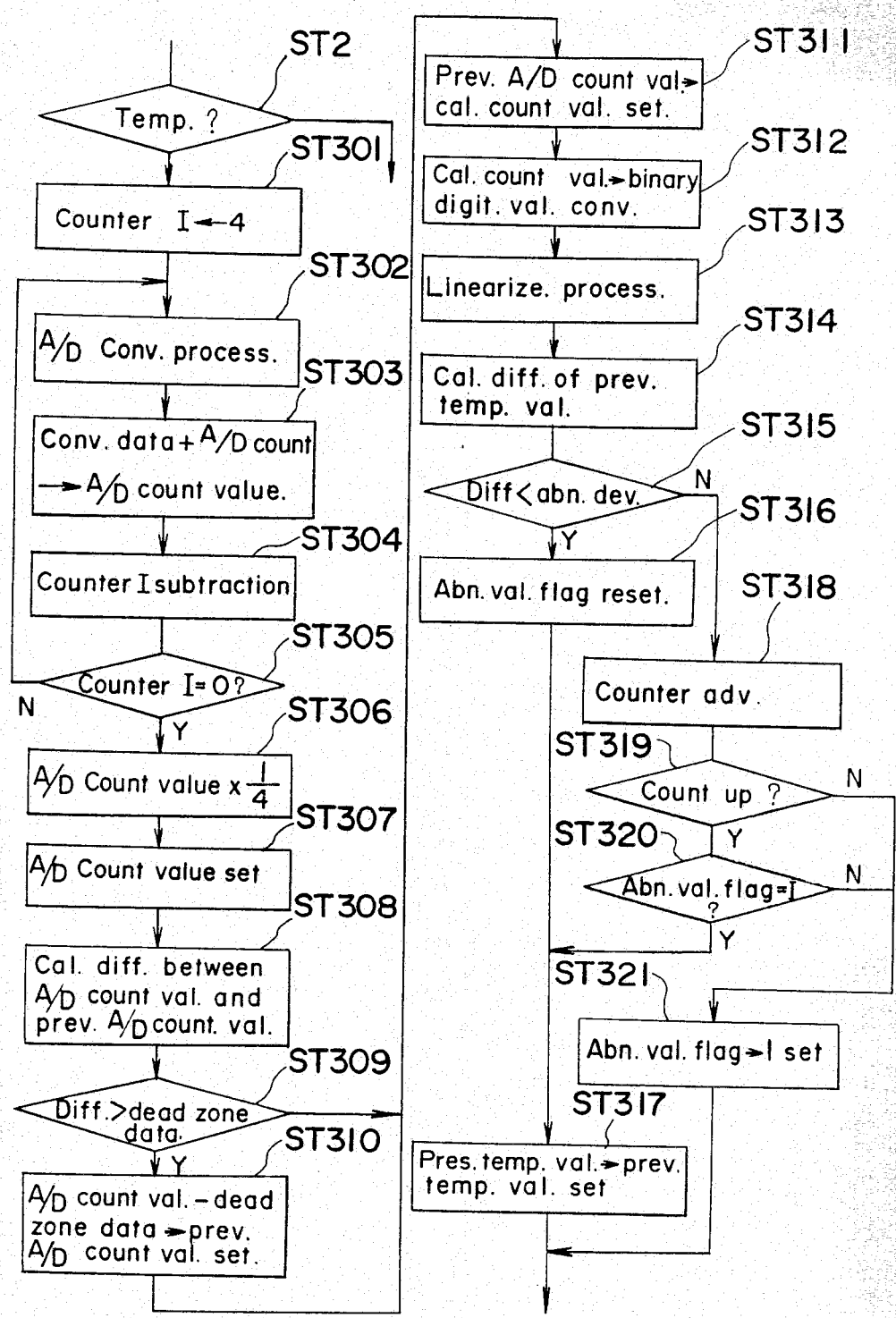
FIG. 4 is a flow-chart illustrating in detail, temperature input processing routine as related to the present invention.

As shown in FIG. 4, when the functioning enters the temperature input processing routine, a numerical value "4" is first stored in a counter I (memory area m5) at a step ST301. Subsequently, the temperature input signal (analog amount) applied from the amplifier 2 is converted at the A/D converter 3 into digital amount at a step ST302. The digital amount thus obtained is added to A/D count value (initially of zero) stored in a memory area m1, and the result of this addition is stored in the memory area m1 as the A/D count value (step ST303) namely to effect accumulation of the converted digital amount. Thereafter, "1" is subtracted from the counter I, as a result of which subtraction, content of the counter I becomes 3 (step ST304). Successively, judgement is made as to whether or not the content of the counter I is "0" at a step ST305. Since the content is not of "0" at the initial stage, judgement becomes NO, with the step reverted to the step ST302 again. Thus, the temperature input signal from the amplifier 2 is once more converted into digital amount by the A/D converter 3. Subsequently, processings from the step ST303 to step ST305 are repeated in the similar manner as above until the content of the counter I becomes "0". When the content of the counter I is rendered to be "0", the repeated processings from the step ST302 to step ST305 have been effected four times, and the converted data for the four times are cumulatively stored in the memory area m1.

When the content of the counter I becomes "0", the judgement at the step ST305 is of YES, and the step is shifted to a subsequent step so that the accumulated A/D count value stored in the memory area m1 is multiplied by ¼ to calculate an average value of the converted data (step ST306) for setting the average value thus obtained, i.e. A/D count value at a step ST307. At a step ST308, a difference between the present A/D count value thus set and the previous A/D count value stored in the memory area m2 is calculated for comparison of this difference value with dead zone data preliminarily stored in the memory area m3 at a step ST309. As a result of the above comparison, if the difference value is smaller than the dead zone data, the previous A/D count value in the memory area m2 is set as it is in a memory area m4 as the calculated count value by neglecting the present variation component at a step ST311.

On the contrary, upon comparison at the step ST309, if the difference value is larger than the dead zone data, a value obtained by subtracting the dead zone data from the present A/D count value stored in the memory area m1, is set in the memory area m2 as the previous A/D count value. In other words, the value obtained by removing or subtracting the dead zone data from the difference value is used as the present variation component with respect to the previous value for renewal of the previous A/D count value in the memory area m2 (step ST310), and the above renewed previous A/D count value thus obtained is set in the memory area m4 as the calculated count value (step ST311).

Subsequently, the calculated count value is converted into binary decimal value (step ST312) for linearizing processing, and is further converted into temperature value so as to be stored in a memory area m7 (step ST313). Successively, a difference between the present temperature value and the previous temperature value stored in a memory area m6 is obtained at a step ST314 so as to be compared with abnormal deviation preliminarily stored in a memory area m10 at a step ST315. As a result of the above comparison, if the difference value is smaller than the abnormal deviation, abnormal value flag in a memory area m9 is reset (ste ST316), and the present temperature value subjected to the variation is set as the previous temperature value (step ST317). When control calculation routine is entered by the subsequent functioning, predetermined calculations are effected based on the above renewed previous temperature value.

As a result of the comparison at the step ST315, if the difference value is larger than the abnormal deviation, a counter II in a memory area m8 is advanced by one step at a step ST318. Subsequently, judgement is made as to whether or not the counter II has counted up at a step ST319, and since the judgement is of NO at the initial sampling cycle, abnormal value flag in the memory area m9 is set at a step ST321, and subsequent control calculations are effected, with the previous temperature value being maintained as it is, by neglecting the present temperature value.

If the state in which the difference value between the previous temperature value and the present temperature value is larger than the abnormal deviation, is continuously present, the sampling cycle functioning is repeated until the counter II counts up (step ST319). Upon counting up of the counter II, judgement is made as to whether or not the abnormal value flag is "1" (step ST320), and in the above case, if the abnormal value flag is in the set state (=1), the judgement is of YES, and the continuous abnormal value as referred to above is regarded as a normal value due to temperature variation, with the present temperature value stored in the memory area m7 being set in the memory area m6 as the previous temperature value. Thus, upon entry into the control calculation routine in the subsequent functionings, predetermined calculations are effected based on the above new previous temperature value. In the judgement in the step ST320, if the abnormal value flag is not of "1", the present temperature value is regarded as an abnormal value since the temperature value in the previous sampling cycle is within the deviation, and the abnormal value flag is set (step ST321), and subsequent processing are effected, with the previous temperature value maintained as it is, by neglecting the present temperature value.

Subsequently, supplementary description will be given on the functionings from the step ST313 to step ST321 in the processing flow as described so far, with reference to examples of temperature variations as shown in FIG. 6.

It should be noted here that in FIG. 6, LT represents the normal temperature level at the initial state, T shows the sampling period, and L denotes the abnormal deviation, while D1, D2, . . . and D13 show temperature values varying with time at respective sampling periods.

In FIG. 6, since the temperature values D1 and D2 are of the normal temperature level, there is no change in the values thereof, with the difference between the present temperature value and the previous temperature value being zero, and functionings proceed in such a manner as step ST315 judgement YES→step ST316→step ST317 in the flowchart of FIG. 4. However, at the temperature value D3, the abnormal deviation range L is exceeded, and in this case, functionings proceed in a manner as step ST315 judgement NO→ step ST318→step ST319 judgement NO→step ST321. In other words, the temperature value D3 is neglected as an abnormal temperature value. Subsequently, the temperature value D4 is within the deviation range with respect to the previous temperature value, and thus, the processing flow proceeds in such a manner as step ST315 judgement YES→step ST316→step ST317 in the similar fashion as in the case of the temperature values D1 and D2.

Since the temperature value D5 again exceeds the deviation range, the processing flow proceeds in a manner as step ST315 judgement NO→step ST318→step ST319 judgement NO→step ST321. Owing to the fact that the temperature value D6 at the next sampling cycle is within the deviation range, processing similar to that for the temperature value D4 is effected. Meanwhile, the temperature values D7, D8, D9, D10, and D11 for the sampling cycles further continuing are varied beyond the abnormal deviation over the previous temperature value D6, and up to the temperature value D9, processing in the manner as step ST315 judgement NO→step ST318→step ST319 judgement NO→step ST321 are repeated in the similar fashion as in the above temperature values D3 and D5. However, at the temperature value D10, the counter II counts up due to the fact that the abnormal temperature value has continued. Therefore, at the sampling cycle for the temperature value D10, the processing proceeds in the manner as step ST315 judgement NO→step ST318→step ST319 judgement YES→step ST320 judgement YES→step ST317, and thereafter, the temperature value D10 is treated as a normal value. More specifically, in the case where constant sampling number and abnormal value have continued, they are regarded as values due to temperature variations, instead of abnormal values, and these values are thereafter regarded as normal temperature values for effecting the subsequent control calculation processings. Accordingly, the next temperature value D12 is regarded as the abnormal value, since it is of a variation exceeding the abnormal deviation on the assumption that the temperature value D10 is of normal temperature value, while on the contrary, the temperature value D13 is treated as a normal value.

In the manner as described above, although the values singly or individually exceeding the abnormal deviation such as the temperature values D3, D5, and D12, etc. are neglected as abnormal values, in the case where the temperature values exceeding the abnormal deviation continue, they are regarded as normal temperature values for reflection thereof in the subsequent control calculation processings. As a result, the temperature control device according to the present invention can effect stable control, without being affected by any sudden variations or changes.

As is clear from the foregoing description, according to the temperature control device of the present invention, the arrangement is so made that the average value of the digital output amount of the A/D converter is obtained, and if the variation of the above digital output amount average value at each sampling is within the predetermined dead zone data, it is regarded that there is no change, while on the other hand, if the above variation is larger than the dead zone data, control is effected on the assumption that variation has taken place by the amount obtained by removing the dead zone data from the amount of the variation, and therefore, even when ripple component is contained in the detected temperature signal, minor variation component by the ripple component may be neglected so as to obtain stable digital data, without being affected by such ripple component and thus, proper control can be advantageously effected depending on the detected temperature signals.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a temperature control device comprising means for detecting temperature of an object to be controlled, an A/D converting means for converting analog amount from said temperature detecting means into digital amount, a target value setting means, an operation unit for effecting predetermined calculation based on the digital amount from said A/D converting means and the target value from said target value setting means, and an output control section for applying a predetermined control amount to said object based on result of the calculation by said operation unit, the improvement comprising means for obtaining an average value of the digital output amount from said A/D converting means, means for obtaining a difference value between said digital output amount average value thus obtained and a digital output amount average value previously detected and separately stored, means for comparing said difference value with a predetermined dead zone data value, and means for setting in a memory a digital output amount the same as the previous digital output amount in the case where said difference value is smaller than said dead zone data value in the comparison by said comparing means and for setting in said memory a digital amount value obtained through subtraction of said dead zone data from said difference value in the case where said difference value is larger than said dead zone data, thereby to effect the predetermined calculation at said operation unit by said digital output thus set in said memory.

2. A temperature control device as claimed in claim 1, wherein said temperature detecting means (1) is a thermocouple thermometer.

3. A temperature control device as claimed in claim 1, wherein said temperature detecting means (1) is a thermistor thermometer.

4. A temperature control device as claimed in claim 1, wherein said operation unit (4) is a micro-processor.

5. A temperature control device as claimed in claim 1 where in said digital amount value obtained through subtraction of said dead zone data from said difference value is the difference between said digital output amount average value and said dead zone data value.

* * * * *